United States Patent [19]

Myers et al.

[11] 4,194,343
[45] Mar. 25, 1980

[54] DRY BIN FILLER

[75] Inventors: Harold E. Myers; Charles E. Sheetz, both of Woodstock, Va.

[73] Assignee: FMC Corporation, San Jose, Calif.

[21] Appl. No.: 649,933

[22] Filed: Jan. 19, 1976

[51] Int. Cl.² .................... B65B 57/14; B65B 39/12
[52] U.S. Cl. .......................................... 53/493; 53/64; 53/535; 414/79; 53/248; 53/244; 198/697; 198/698
[58] Field of Search ............... 198/35, 37, 40, 31 AC, 198/77, 162, 165, 139, 160, 697–699, 418, 442, 437, 594, 604, 606, 607, 626–628; 214/6 G, 6 F, 6 FA, 17 R, 17 C, 17 CA, 15 D, 15 E; 53/160, 162, 164, 165, 244, 248, 245, 64, 493, 535, 537, 538; 414/79, 88, 110, 295, 398

[56] References Cited

U.S. PATENT DOCUMENTS

| 3,019,581 | 2/1962 | Phillips et al. | 53/244 |
| 3,053,378 | 9/1962 | Longenecker | 198/139 |
| 3,125,209 | 3/1964 | Butler et al. | 198/139 |
| 3,147,846 | 9/1964 | Huntoon | 198/37 |
| 3,254,755 | 6/1966 | O'Brien | 198/37 |
| 3,412,877 | 11/1968 | Lee et al. | 214/17 CA |
| 3,543,908 | 12/1970 | Holland | 198/31 AC |
| 3,633,732 | 1/1972 | Russell | 198/628 |
| 3,869,038 | 3/1975 | Piper et al. | 198/165 |
| 3,877,585 | 4/1975 | Burgess | 198/37 |
| 3,932,982 | 1/1976 | Klapp | 53/244 |

FOREIGN PATENT DOCUMENTS

| 1556138 | 1/1970 | Fed. Rep. of Germany | 214/6 G |
| 1031334 | 6/1966 | United Kingdom | 198/160 |

Primary Examiner—Joseph E. Valenza
Attorney, Agent, or Firm—R. S. Kelly; W. H. May

[57] ABSTRACT

An apparatus for gently transferring delicate produce from a supply conveyor into a dry storage bin. The discharge head of the apparatus has a reversible delivery board which directs and uniformly stacks the produce within the bin without bruising the produce. The transfer apparatus utilizes a series of opposed brushes on a parallel conveyor arrangement to gently support and transfer the produce to the bin. The discharge head and the bin move relative to each other in both the horizontal and vertical planes to provide uniform layers of produce and to adjust for the increasing layers in the bin.

7 Claims, 12 Drawing Figures

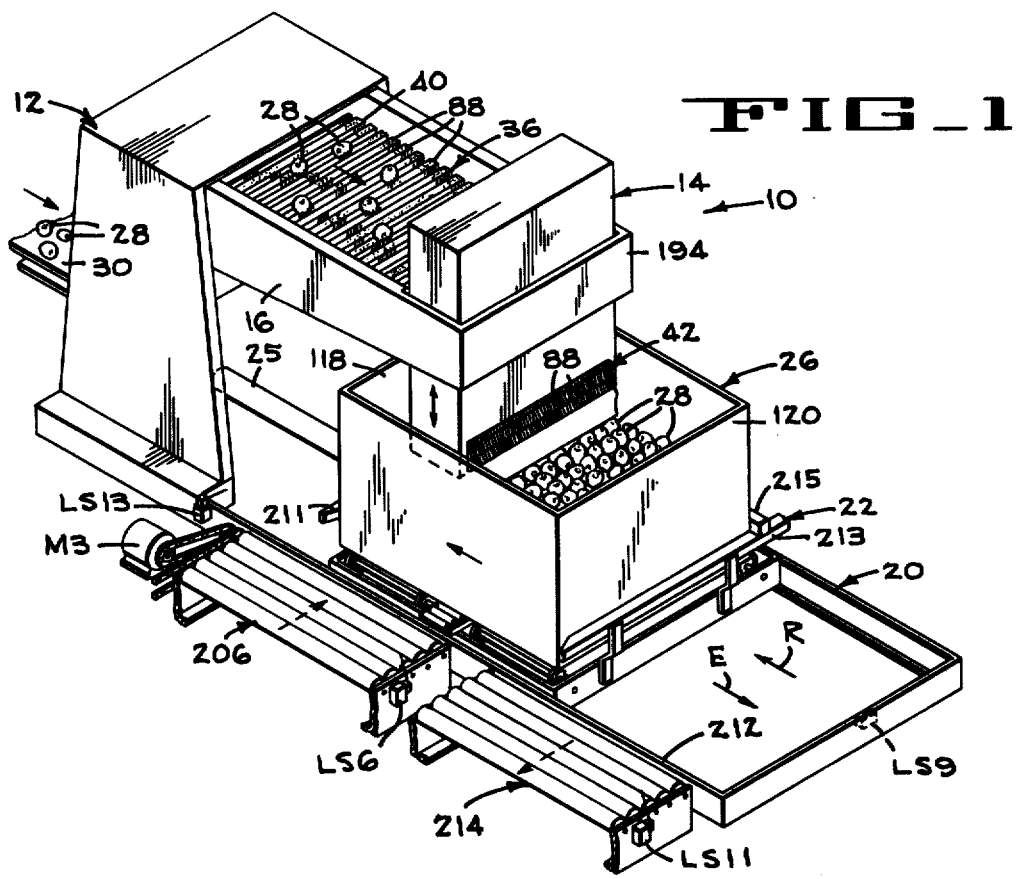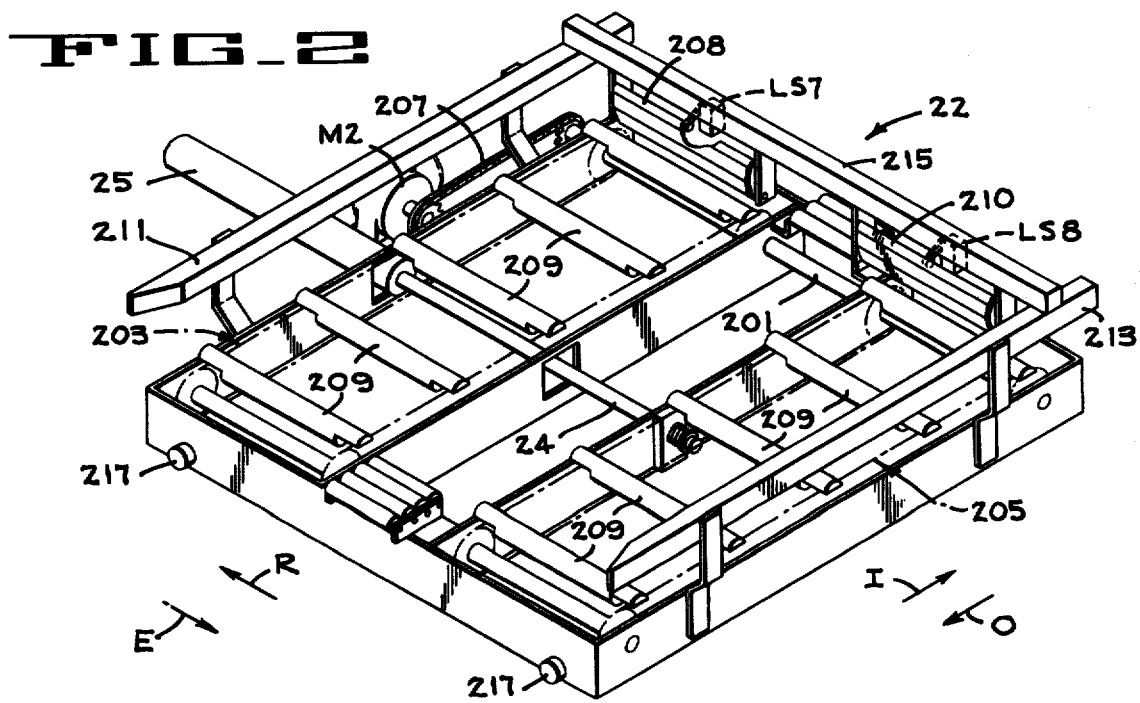

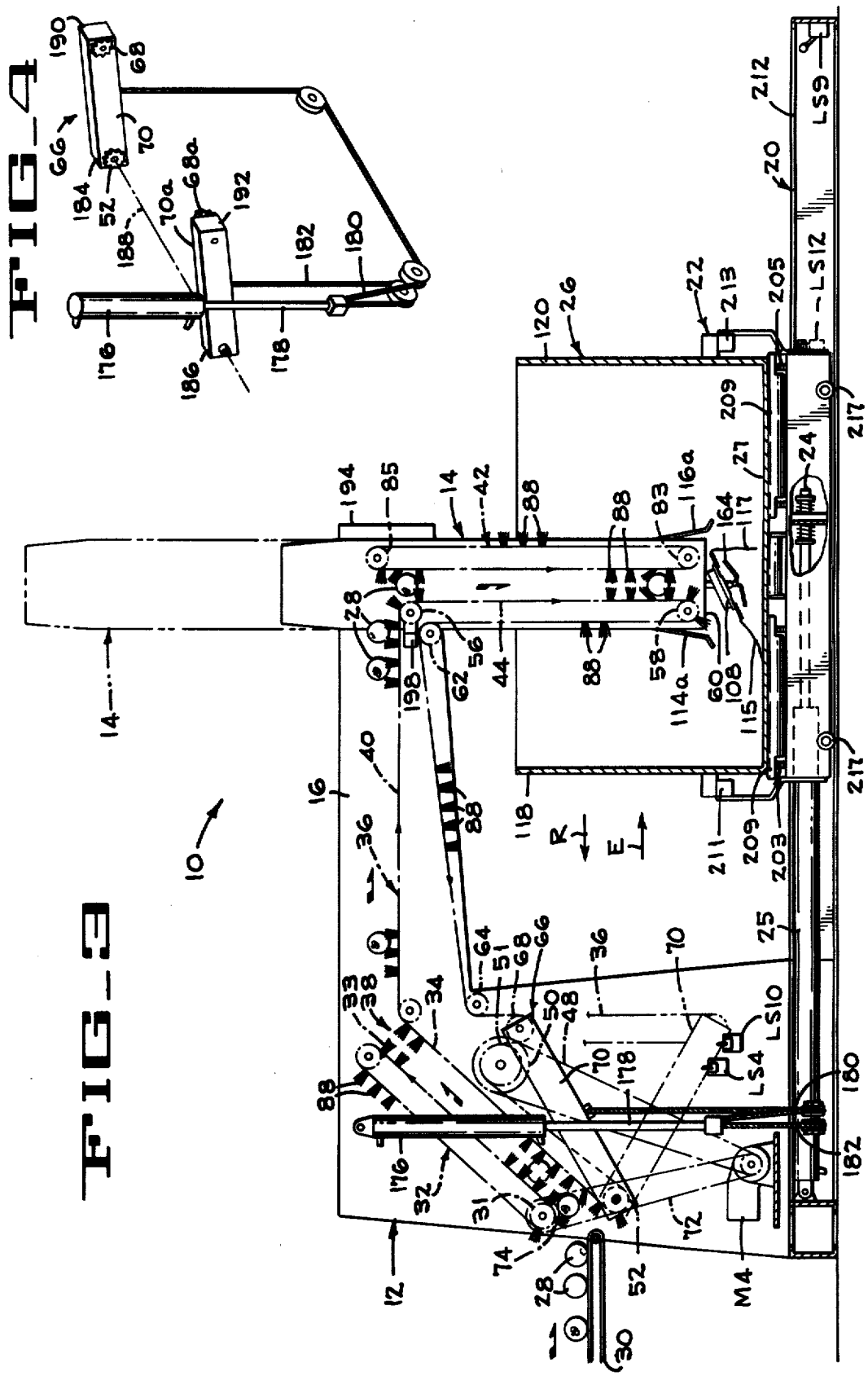

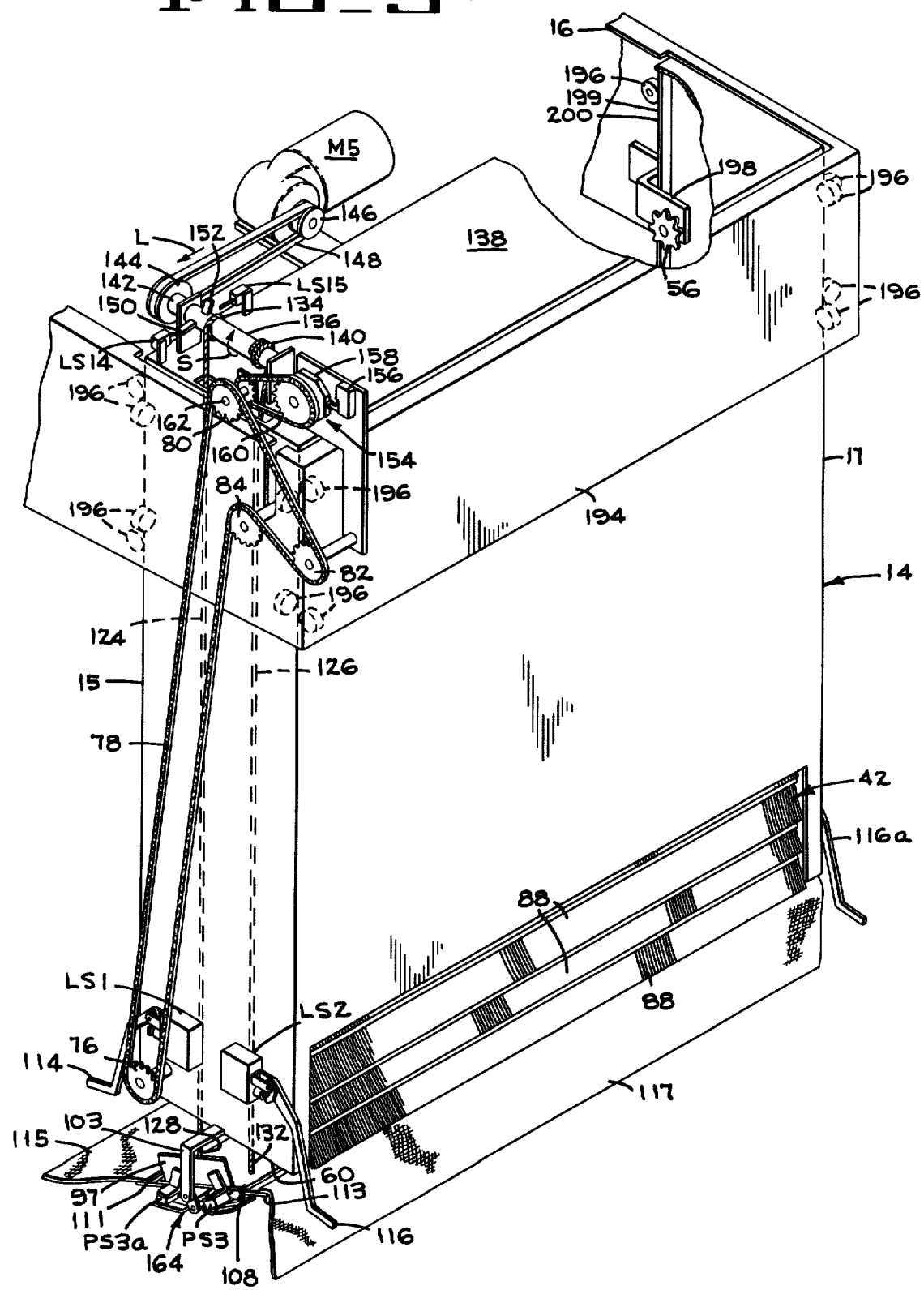

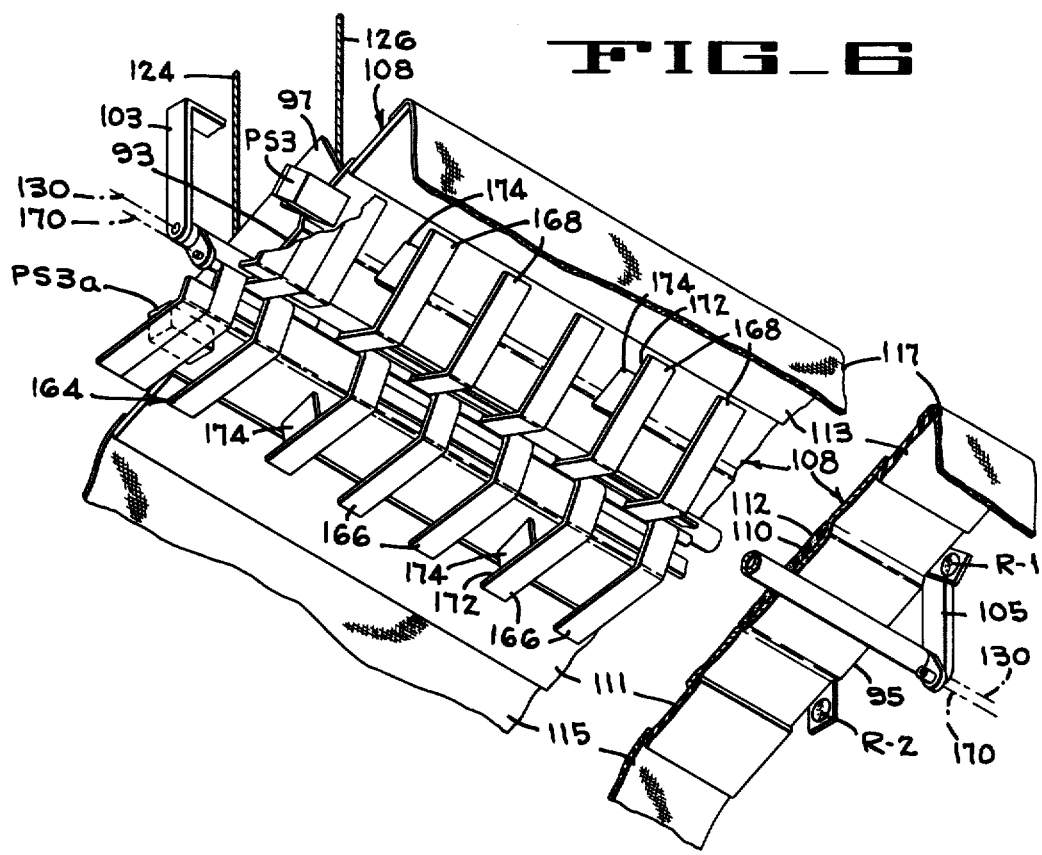
FIG_6
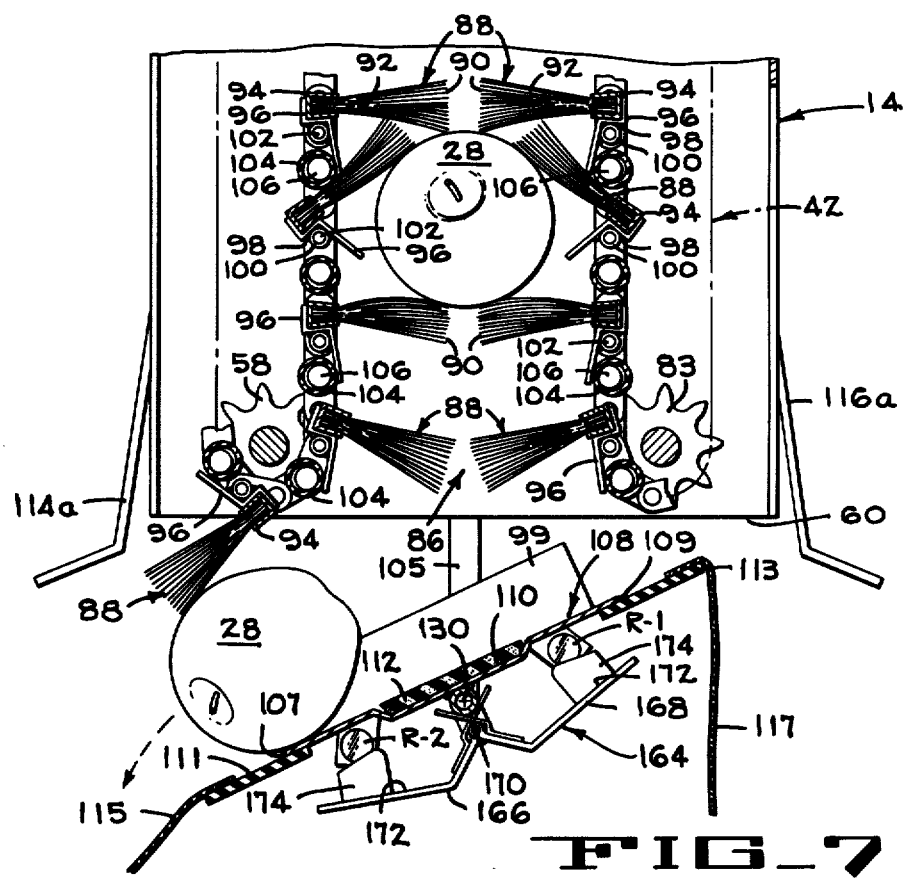
FIG_7

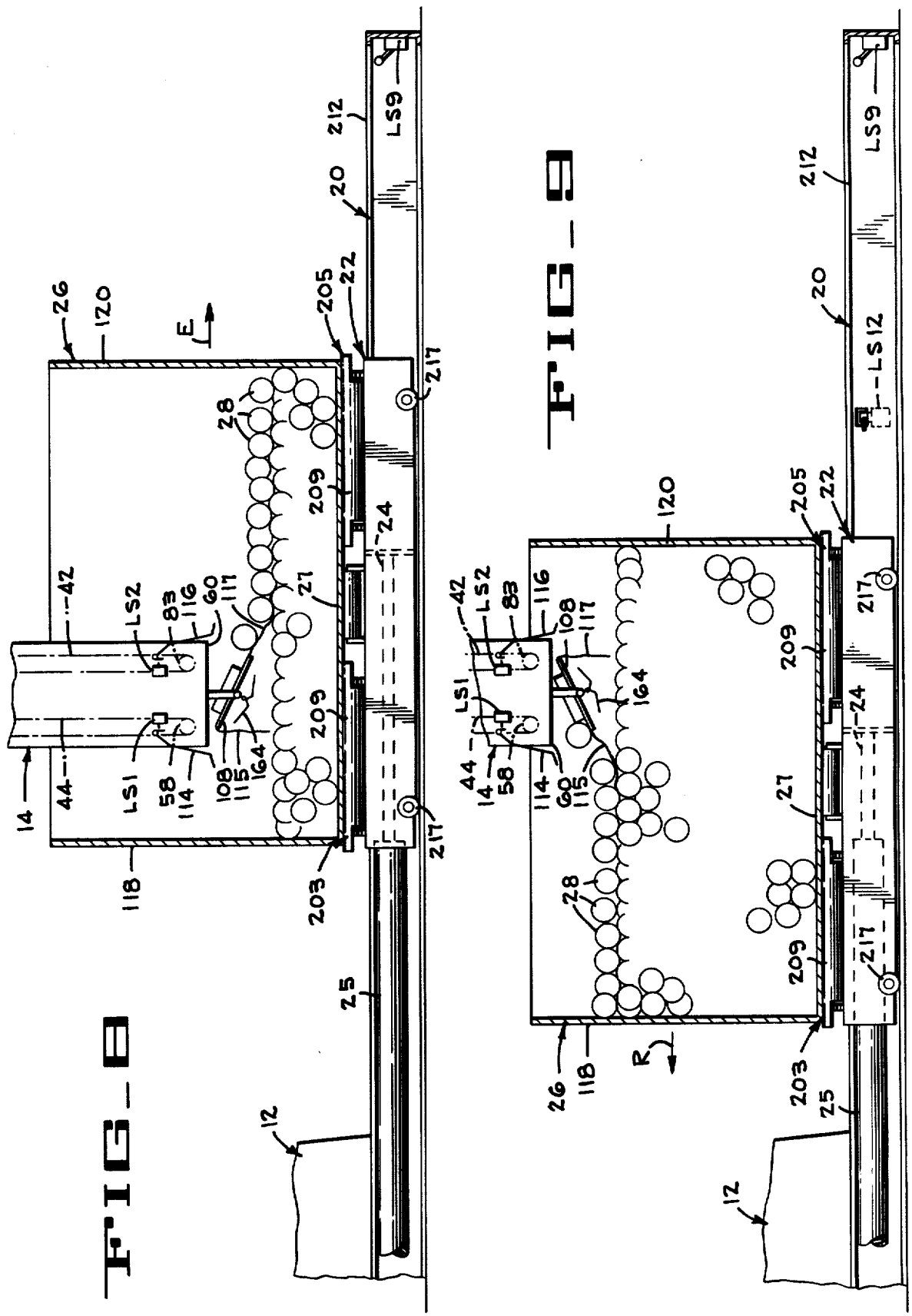

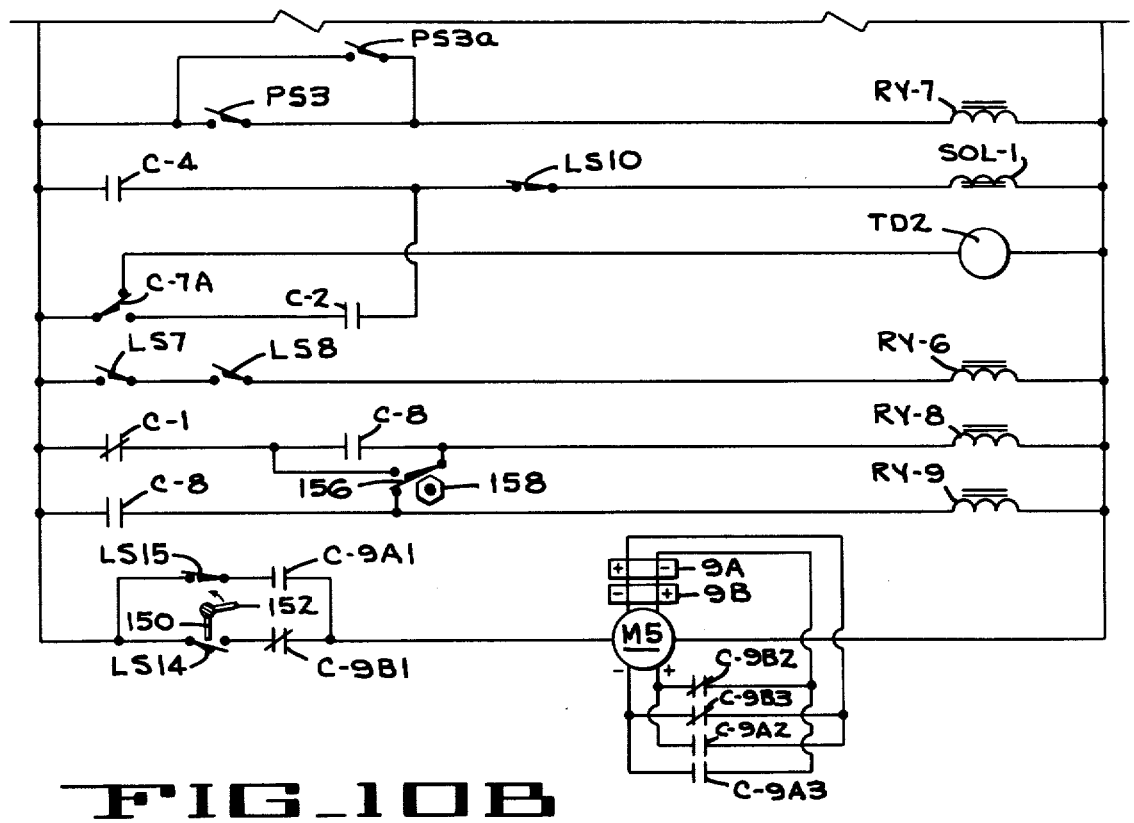
FIG_10B
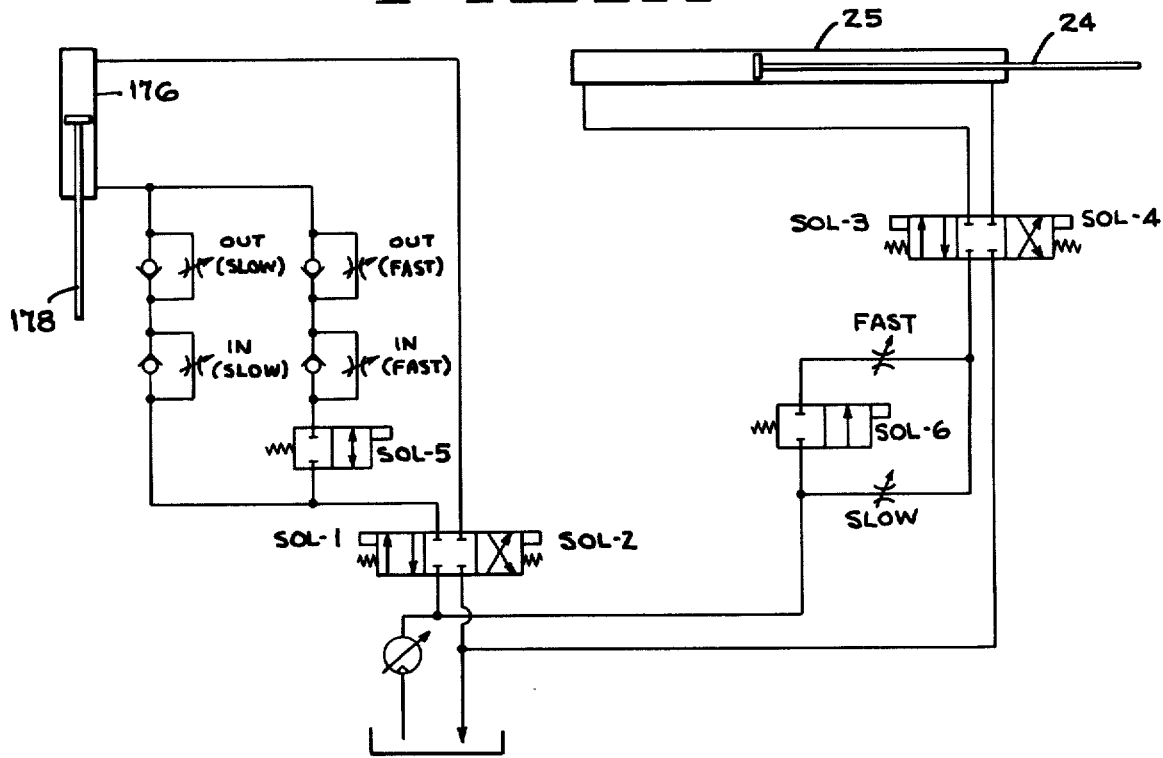
FIG_11

DRY BIN FILLER

BACKGROUND OF THE INVENTION

1. Field of the Invention

This invention relates to apparatus utilized to fill storage bins with fruit or other produce and, more particularly, is related to the automatic and gentle placement of produce which is highly susceptible to bruising in large dry storage bins.

2. Description of the Prior Art

When large quantities of produce such as apples are harvested from the field, it is commercially desirable to store many of such apples in cold storage to increase their useful fresh life, providing the consuming public with fresh apples for several months after harvest time. Consequently, large quantities of apples are placed in cold storage after they are automatically sorted according to their size and grade. One integral step in this process is the actual depositing of the apples of like size and grade into large cold storage bins after the grading process. However, this depositing step becomes extremely critical to the integrity and quality of the apples, because apples are highly susceptible to bruising during their placement one on top of another in the large cold storage bins. An apple not only loses its commerical desirability whenever it acquires a bruise, but also it becomes a source of possible bacteria growth, rendering the apple and those adjacent it in storage inedible. Consequently, it is of extreme importance to gently place the apples in the storage bins without bruising them.

Various techniques have been considered to quickly, but gently, deposit apples in the large cold storage bins after they have been graded. One widely used method entails the use of a rather large water flow system. The apples are transported through flumes in which the apples proceed to a water filled bin and, after the filling of the bin with apples, the water is evacuated to provide a bin filled with apples with a minimum of damage to them.

Although the presently used flume method is generally satisfactory in preventing unwanted damage to the apples, the system requires a large amount of area with much heavy equipment necessary to transport the water used for carrying and depositing the apples. Further, it has been found that the system requires a significant amount of maintenance because of its contact with the water, rendering constant susceptibility to corrosion. Also, the exposure of the apples to water presents some potential problems in the fresh maintenance of the apples, since in some cases the wet apples and machinery may experience fungus growth. In addition, the water may acquire various chemicals found on the fruit which could present eventual problems to the machinery and the fruit during storage.

Most prior art mechanisms which have been designed to deposit articles from a supply conveyor into a dry storage bin do not address the problem which is incident with the storage of fruit or produce that is highly susceptible to bruising. Some mechanisms, such as disclosed in the Horgan U.S. Pat. No. 3,000,161 and Phillips et al U.S. Pat. No. 3,019,581, have been directed to the placement of cigarettes in storage containers wherein the cigarettes are placed in layers within the container. However, the devices shown in these patents do not include a delivery means to dampen and direct the flow of the articles onto others already in the container. Further, these patents do not disclose the use of a conveying means for gently supporting the movement of the articles through the apparatus. In other devices such as disclosed in the Griffith U.S. Pat. No. 2,889,676 and Wickam et al U.S. Pat. No. 3,825,106 there are conveyor systems which utilize a series of movable plates that contact the produce and move it along to place it within the container, resulting in possible bruising damage to the produce in the case of an item such as an apple. A further concept in the prior art, shown in the Hostetler U.S. Pat. No. 3,283,472, utilizes a tiltable bin filler wherein the filler mechanism receives the produce and then is tilted at an angle downward into the storage bin to allow the produce to flow into the bin, undoubtedly resulting in bruising damage to the produce.

SUMMARY OF THE INVENTION

The present invention comprises a conveyor system having a plurality of opposed and cooperating flexible protuberances uniformly spaced in the direction of conveyor movement to cradle the movement of fruit or produce from an inlet portion to a discharge head to thereby provide a cushioning effect upon the movement of the produce into a storage bin, thereby eliminating possible bruising to the produce. The inlet portion and discharge head are elongated in the direction transverse of the direction of movement of the conveyor system in order to accommodate a row of fruit. Preferably, a reversible delivery mechanism directs the movement of the produce exiting the discharge head to aid in the uniform layering of the produce in the storage bin.

The cradling flexible protuberances are preferably comprised of brushes on respective opposed pairs of conveyors to gently support the produce in suspension between the conveyors without bruising it.

The storage bin and the discharge head move relative to each other in both the horizontal and vertical planes in order to accommodate a uniform layering of the produce as it enters the storage bin. Located preferably within the discharge head are sensors to limit the amount of travel in two reversing directions between the discharge head and the bin in a horizontal plane. Further, there are produce sensors preferably in the lower portion of the discharge head to raise the discharge head in relation to the increasing layers of the produce.

The present invention also preferably incorporates a special timing mechanism, so that the delivery mechanism will not reverse its orientation until the conveying brushes are in a correct position to eliminate possible damage to the discharging produce that might otherwise contact the delivery mechanism during its reversing operation.

The present invention, therefore, provides an apparatus to automatically fill a dry storage bin with produce without causing any bruising damage to the produce. The speed for filling the bins with the present invention is comparable to the presently used flume method. Since the subject invention does not require the use of water as a transfer media for the produce, there are no maintenance problems related to corrosion and no potential fungus growth within the system. Further, the size of the present invention is significantly smaller than that required to support a flume delivery arrangement.

BRIEF DESCRIPTION OF THE DRAWINGS

FIG. 1 is a perspective view of the overall dry bin filler invention;

FIG. 2 is a perspective view of the conveying and transferring carriage for movement of the storage bin relative to the discharge head;

FIG. 3 is a longitudinal sectional view of the overall dry bin filler;

FIG. 4 is a schematic view of the take-up system for moving the discharge head;

FIG. 5 is a perspective view of the discharge head;

FIG. 6 is an enlarged perspective view of the delivery area of the discharge head of FIG. 5;

FIG. 7 is a partial vertical section of the lower end of the discharge head showing the brush arrangement and delivery board;

FIG. 8 is a diagrammatic operational view of the dry bin filler of the present invention particularly showing the discharge head located in a low position in a storage container with the delivery board positioned in a first angled orientation;

FIG. 9 is a diagrammatic operational view similar to FIG. 8 but showing the discharge head located in a high position in the storage bin with the delivery board positioned in a second angled orientation;

FIGS. 10A and 10B comprise a schematic electrical circuit for the overall dry bin filler; and FIG. 11 is a schematic hydraulic circuit for the overall dry bin filler invention.

DETAILED DESCRIPTION OF THE INVENTION

Figure 10A:
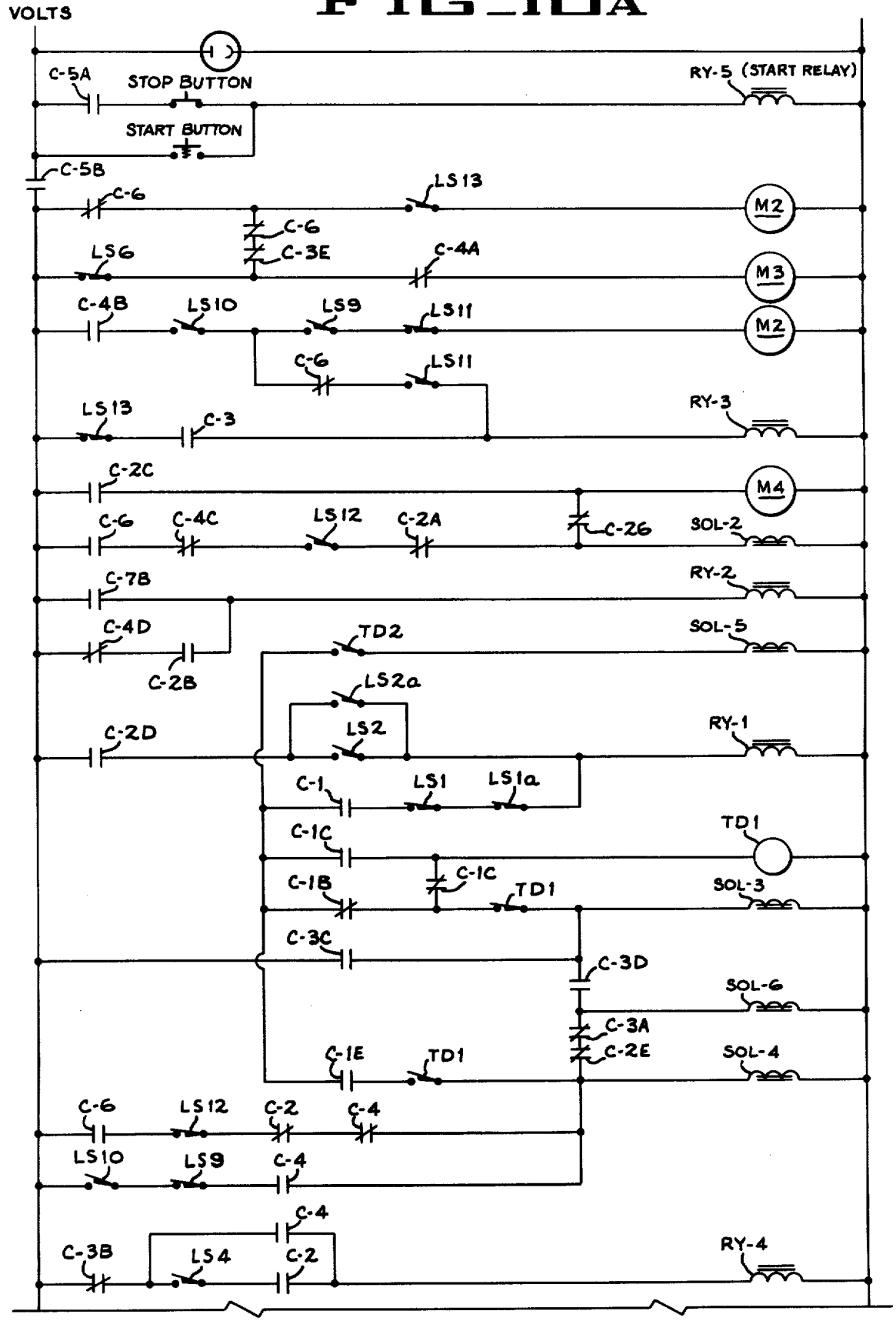

The dry bin filler invention 10 is generally shown in FIG. 1 as having an inlet portion 12 and a vertically movable discharge head 14 which are connected by an extension boom 16. Located below the discharge head 14 are carriage tracks 20 to guide the movement of a carriage 22 in a horizontal plane toward and away from the inlet portion 12 with said carriage being moved by a hydraulic cylinder 25. A dry storage bin 26, is positioned on the carriage 22 for horizontal traversing movement relative the discharge head 14.

As shown more clearly in FIG. 3, the dry bin filler 10 utilizes a conveyor system for the transferring of produce 28, such as apples, from a supply conveyor 30 to the storage bin 26. Located in the inlet portion 12 of the dry bin filler is an upwardly inclined conveyor 32 which operates on sprockets 31 and 33 and acts in cooperation with an upwardly inclined run 34 of a large interface conveyor 36 to move the produce 28 up an inclined path 38 and onto a horizontal run 40 of the interface conveyor 36 for movement along the boom 16 to the discharge head 14. Positioned vertically within the discharge head 14 is a delivery conveyor 42 which operates on sprockets 83 and 85 and is mounted in opposition to a vertical run 44 of the interface conveyor 36 to move the produce 28 downwardly into the storage bin 26.

The interface conveyor 36 is driven by a motor M4 (FIG. 3) off a drive chain 48 connected to a drive sprocket 50. With particular reference to FIG. 3, by following the general contour of the interface conveyor 36 in its clockwise directional movement from its drive connection, the conveyor will be seen to proceed from a sprocket 51, mounted so as to rotate with the drive sprocket 50, down to a lower sprocket 52 from which it travels up the inclined run 34 to an upper sprocket 54. The interface conveyor 36 then moves along the generally horizontal run 40 to a second upper sprocket 56, around the sprocket, and vertically downward along the vertical run 44 to a delivery sprocket 58 at the lower end 60 of the discharge head 14. The conveyor 36 travels around and vertically upward from the sprocket 58 to a return sprocket 62 in the boom 16 which directs the conveyor 36 on its return motion across the boom 16 to a take-up diverting sprocket 64 located in the inlet portion 12 of the bin filler. It should be recognized that the inclined conveyor 32, interface conveyor 36 and delivery conveyor 42 are formed by a pair of spaced endless chains, one being provided at each side of the bin filler. Thus, references heretofore and hereinafter made to the sprockets on the respective inclined conveyor 32, interface conveyor 36, and delivery conveyor 42 indicate that such a sprocket is provided on each side of the dry bin filler for facilitating the movement of its respective conveyor chain. If both sprockets are shown, the second sprocket will be noted by the same number with a suffix a.

The interface conveyor 36 moves from the diverting sprocket 64 into a take-up arrangement 66 comprised of a diverting sprocket 68. The sprocket 68 and its companion sprocket 68a are connected to respective pivotal take-up arms 70 and 70a as shown in FIG. 4. The take-up arrangement 66 will be explained in further detail hereinafter in conjunction with the operation of the vertically moving discharge head.

The interface conveyor 36 (FIG. 3) moves from the sprocket 68 to the drive sprocket 51 to complete its clockwise path. The motor M4 which drives the interface conveyor 36 also drives the inclined conveyor 32 through a second drive chain 72 connected to a drive sprocket 74 in such a manner that the linear speed of the inclined conveyor 32 is the same as that of the interface conveyor 36. Similarly, the delivery conveyor 42 is driven by a drive sprocket 84 (FIG. 5) that is mounted on the stub shaft that mounts the upper sprocket 85 of the delivery conveyor. The sprocket 84 is driven by means of a drive chain 78 (FIG. 5) in such a manner that the delivery conveyor 42 will operate at the same linear speed as that of the interface conveyor 36. The drive chain 78 is trained about a sprocket 76 that is mounted for joint rotation with the discharge sprocket 58 (FIG. 3) of the interface conveyor 36 and is also trained about a pair of adjacent direction reversing sprockets 80 and 82, so that the chain will drive the delivery conveyor sprocket 84 in a counterclockwise direction with reference to FIG. 5. Consequently, the delivery conveyor 42 (as shown in FIG. 3) will move in the opposite direction of the corresponding portion of interface conveyor 36, providing cooperating joint downward movement by the opposed runs of the delivery conveyor 42 and the interface conveyor 36 in the vertical discharge path 86 of the discharge head 14.

Mounted on each of the respective conveyors 32, 36 and 42 in the dry bin filler are a series of uniformly spaced brushes 88, as shown in FIG. 3, which are connected between the conveyor chains so as to extend across the dry bin filler and which are in opposed, or facing, relation with each other in the inclined path 38 between the inclined conveyor 32 and the interface conveyor 36 as well as in the vertical discharge path 86 between the delivery conveyor 42 and the interface conveyor 36. Each of the brushes 88 is comprised of one long brush extending the width of each of the conveyors. As shown more clearly in FIG. 7, the brushes are spaced equally on each of the conveyors from center to center, preferably 2½ inches apart. Further, in the vertical discharge path 86, as well as in the inclined path 38, the free ends 90 of the brush bristles 92, which directly face each other from the respective conveyors, are spaced by a distance substantially smaller than the size of the produce 28 that is being transferred through the dry bin filler. The brushes 88 are thereby designed to receive the produce 28 and hold it gently but firmly during its conveying process from the supply conveyor 30 (FIG. 1) through the dry bin filler mechanism and into the storage bin 26.

It should be noted, as shown in FIG. 7, that the brushes 88 are pivotally mounted to the respective conveyor chains in order to provide more room between the individual brushes 88 to hold larger pieces of produce. Each brush 88 has its mounting chaannel 94 attached to a pivot lever 96 which is welded at 98 to a sleeve 100 rotatably mounted upon a short stub shaft 102 extending inward from and being affixed to appropriate conveyor chain link. The stub shaft 102 and the associated lever 96 are located at the ends of each brush 88 directly adjacent to the respective conveyor chains and do not extend completely across the width of the conveyors. Each brush 88 will be permitted to pivot in one direction, as shown in FIG. 7, out of their normal perpendicular relationship with the associated conveyor chains and until its bristles 92 contact a stop tube 104 which extends between the associated conveyor chains between two short stub shafts 106 extending slightly inward from conveyor chain links on each side of the conveyor. The brushes are spring biased (by means not shown) to maintain their orientation generally perpendicular to the direction of movement of the conveyor. The brushes are allowed to pivot in only the one direction (upward in the orientation shown in FIG. 7), since the lever 96 will contact the stop tube 104 on the other side of the brush when the brush is allowed to return to its biased position generally perpendicular to the conveyor. The prevention of any pivoting of the brushes 88 in one direction (downwardly with respect to FIG. 7) is extremely important when the brushes are moving the produce down the vertical discharge path 86 in the discharge head 14 since downward pivoting of the brushes 88 would allow the produce to fall, resulting in damage to the produce.

Attention is now directed to the area adjacent the lower end 60 of the discharge head 14, as shown in FIGS. 6 and 7. Pivotally mounted on brackets 103 and 105 slightly below the lower end 60 of the discharge head 14 is a delivery board 108 having a pivot axis 130. On the upper surface 110 of the delivery board 108 and at the center thereof is a resilient cushion 112 to gently receive the produce released by the conveyor brushes 88 from the lower end 60 of the discharge head 14. Extending up from each of the transverse ends 93 and 95 (FIG. 6) of the delivery board 108 are respective guard plates 97 and 99 to keep produce 28 from rolling off the ends 93 and 95 of the delivery board. The delivery board 108 is designed to periodically alternate between two angled positions which are respectively shown in FIGS. 8 and 9. As will be explained in further detail herein, the storage bin 26 reciprocates relative to the discharge head 14 in a horizontal direction in order to provide a uniform layering and placement of the produce. With reference to FIG. 7, the delivery board 108 is there shown as being angled (preferaby at 25 degrees) from the horizontal in a counterclockwise direction. This similar orientation of the delivery board is shown in FIG. 9 where the bin 26 is seen to be moving to the left; thus, it can be seen that the discharging produce will exit the discharge head in the same direction that the bin 26 is moving relative to said discharge head thereby avoiding any possible blockage of the produce flow into the bin by the discharge head. Similarly, as shown in FIG. 8, the discharge board 108 will reverse to a position, preferably at 25 degrees from the horizontal in a clockwise orientation, when the bin reverses its direction of movement whereby the produce exiting the discharge head 14 will again leave the discharge head in the same direction as the bin is moving relative to said discharge head.

Attached along the longitudinal sides 107 and 109 of the delivery board 108 (FIG. 7) are respective semiflexible extension flaps 111 and 113 which support the flexible protection drapes 115 and 117 that extend outward from each longitudinal side of the delivery board. The protection drapes 115 and 117 are designed to cover either a portion of the bottom of the bin or a portion of a layer of produce (depending upon the height of the discharge head in the bin) to provide protection for not only the discharging produce, but also for the produce already in the bin. Therefore, as shown in FIG. 8, when the bin is traversing in the direction of the arrow E, the drape 117 will lay over the produce already within the bin and act as a buffer between that produce and the produce being delivered from the discharge head 14. It should be noted that the extension flap 111 (FIG. 7) will cause the other protection drape 115 to be held upward in a position where it will not become caught under the delivery board 108 and be prevented from functioning properly as a buffer between the produce when the bin is subsequently traversing in the direction of arrow R as shown in FIG. 9. When the bin reverses direction as in FIG. 9, the protection drape 115 acts as a buffer between the produce while the extension flap 113 (FIG. 7) holds the protection drape 117 out from under the delivery board 108. It should be noted that the protection drapes 115 and 117 not only act as a protective buffer between the produce, but also help to slow down the movement of the produce as it exits the delivery board.

As shown in FIG. 5, located adjacent the lower end 60 of the discharge head 14 on its empty bin feed side 15 are respective bin side sensing levers 114 and 116 which activate respective switches LS1 and LS2 to reverse not only the horizontal traversing movement of the bin relative to the discharge head, but also the angled orientation of the delivery board 108. Attention will be first directed to the latter operation of reversing the delivery board orientations. When the side bin sensor lever 114 (as shown in FIG. 8) contacts the side 118 of the bin 26, it will trip the switch LS1 which will actuate the delivery board to pivot to its orientation shown in FIG. 9. This same operation is repeated when the side bin sensing lever 116 contacts the other side 120 of the storage bin, thereby causing the activation of the switch LS2 to pivot the delivery board 108 to the other angled orientation shown in FIG. 8.

The reversing operation of the delivery board 108 is caused by either switch LS1 or LS2 activating a reversing motor M5 (FIG. 5) which, in turn, vertically shifts a pair of control cables 124 and 126. The lower end of the first control cable 124 is connected to the delivery board 108 on one side of its pivot axis 130. Similarly, the lower end 132 of the second control cable 126 is connected to the delivery board on the other side of its pivot axis 130. The upper end 134 of the first control cable 124 is wrapped in one direction around a rotatable shaft 136 that is rotatably mounted upon the top 138 of the discharge head 14. The upper end 140 of the second control cable 126 is wrapped around the rotatable shaft 136 in a direction opposite to the direction of wrap of the upper end 134 of the first cable 124. One end 142 of the rotatable shaft 136 is connected through a pair of pulleys 144 and 146 and a driving belt 148 to the reversing motor M5. Consequently, the operation of the reversing motor M5 in one direction to cause the shaft 136 to rotate in the direction of arrow L (FIG. 5) will cause the upper end 134 of the first control cable 124 to unwrap from the shaft 136 and lengthen the distance between the shaft 136 and the lower end 128 of the cable 124. At the same time, the upper end 140 of the second cable 126 will wrap around the shaft 136, shortening the distance between the shaft and the lower end 132 of the cable 126. This corresponding change in the relative lengths of the control cables 124 and 126 will result in the pivoting of the delivery board 108 in a counterclockwise direction to the position shown (FIG. 5).

Protruding from the rotatable shaft 136 adjacent its pulley end 142 are arcutely spaced stop bars 150 and 152 which operate in conjunction with the stop motor switches LS14 and LS15 to stop the rotation of the shaft 136 when it has rotated sufficiently to cause the desired angular orientation of the delivery board 108.

Therefore, when the respective control cables 124 and 126 have changed their lengths sufficiently to allow the proper counterclockwise orientation (as viewed in FIG. 5) of the delivery board, the stop bar 150 will contact switch LS14 to stop further rotation of the shaft 136.

A similar, but reverse, operation to that discussed above will occur when the reversing motor M5 causes the rotatable shaft 136 to move in the direction of the arrow S (FIG. 5) to reverse the orientation of the delivery board 108 to a clockwise orientation as viewed in FIG. 8.

Also shown in FIG. 5 is a timing mechanism 154 comprised of a timing switch 156 and a timing cam 158 which is operated by a take off chain 160 tied to the shaft 162 of the reversing sprocket 80 on the delivery conveyor drive chain 78. This timing mechanism 154 is utilized to time the reversing of the orientation of the delivery board 108 to coincide with the proper location of the delivery brushes 88 to prevent reversing of the delivery board when produce may be just about to exit the delivery end 60 of the discharge head 14. Consequently, no discharging produce is damaged from having been squeezed or pinched by this reversing or flipping motion of the delivery board when it changes its angled orientation.

As stated previously, the bin side sensing levers 114 and 116, with their respective switches LS1 and LS2, also act as the control for the horizontal traversing movement of the carriage 22 which carries the bin 26. The movement of the carriage 22 is caused by the extension and retraction of the hydraulic piston shaft 24 (as best seen in FIG. 2). When the lever 114 contacts the side 118 (FIG. 8) of the bin 26 as it is being traversed in the direction of arrow E, the switch LS1 first deenergizes a solenoid SOL-4 to stop the movement of the bin and then activates a solenoid SOL-3 (FIG. 11) through a time delay relay to shift the position of a hydraulic control valve and thereby reverse the direction of the traversing carriage for movement in the direction of arrow R (FIG. 9). A similar reversing operation occurs when lever 116 contacts the side 120 of the bin 26 to activate switch LS2. SOL-3 is deenergized and (after a time delay) solenoid SOL-4 (FIG. 11) is activated to shift the hydraulic control valve in the reverse direction to move the carriage 22 and bin 26 back in the direction of arrow E (FIG. 8).

The time delay which automatically occurs between the engagement of the sensing lever by the side of the bin (which immediately stops the movement of the carriage) and the initiation of reverse movement of the carriage 22 is to allow time for the produce to fill the area adjacent each of the sides 118 and 120 of the bin, including especially the corners. Furthermore, the time delay must be sufficient to allow the delivery board 108 to reverse its orientation before allowing the carriage to traverse in the opposite direction; otherwise, the leading edge of the delivery board, being inclined downwardly, could damage the produce by gouging or poking it.

It is preferable to have a duplicate set of bin side sensing levers 114a and 116a (see FIG. 5) with respective switches LS1a and LS2a on the opposite side 17 of the discharge head 14. This second set of sensing levers and switches not only provides a backup set of switches should one set or the other set fail, but also compensates for the condition where the bin might become slightly askew with respect to the discharge head, resulting in the possibility of one portion of the bin 26 hitting the discharge head 14 before the proper control switch LS1 or LS2 is activated to stop its movement.

The dry bin filler 10 as shown in FIGS. 1-9 is designed to have the discharge head 14 move vertically relative to the storage bin 26 to permit the lower end of the discharge head 14 to lower to the bottom 27 of the bin 26, providing for close proximity between the discharging produce and the bin bottom 27 to insure a gentle placement of the produce into the bin. However, as the produce begins to accumulate in the bottom 27 of the storage bin, it is necessary that the discharge head 14 move slightly upward to accommodate the increasing layers of produce in the bin. A plurality of produce sensors 164 (as shown in FIGS. 6 and 7) are pivotably connected just below the delivery board 108 to automatically activate the upward vertical movement of the discharge head. The produce sensors 164 are comprised of two separate series of levers 166 and 168 pivotally mounted on opposite sides of a pivot axis 170 and alternately spaced across the width of the discharge head. Located on the upper surface 172 (FIG. 7) of both series of levers 166 and 168 are blocking flags 174 designed to operate in conjunction with photoelectric switches PS3 and PS3a mounted on one end 93 (FIG. 6) of the delivery board 108 and their associated reflectors R-1 and R-2, respectively mounted on the other end 95 of the delivery board adjacent the respective series 166 and 168 of produce levers. Any upward pivotal movement of a produce lever 166 or 168 will block one of the reflected light beams and activate the photoelectric switch PS3 or PS3a, causing the discharge head 14 to move upward until the produce lever 166 or 168 is allowed to pivot downwardly and deactivate the photoelectric switch. In this manner the discharge head 14 moves gradually upward as the level of produce within the storage bin 26 increases until the point is reached where the storage bin is completely filled.

The mechanism for moving the discharge head 14 vertically is shown in FIGS. 3 and 4 and comprises a hydraulic cylinder 176 and piston shaft 178. Connected to the hydraulic piston shaft 178 through the respective cables 180 and 182 are the pair of conveyor take-up arms 70 and 70a which are located to support the opposite conveyor chains of the interface conveyor 36 within the inlet portion 12 of the dry bin filler. The take-up arms 70 and 70a are pivotally mounted at their respective base ends 184 and 186 (FIG. 4) concentrically with the rotating axis 188 of the inclined sprockets 52 and 52a (not shown) of the interface conveyor 36. Mounted adjacent the free ends 190 and 192 of the respective take-up arms 70 and 70a are the diverting sprockets 68 and 68a which move with the pivoting take-up arms.

The discharge head 14, as shown in FIG. 3, is in a lowered position in the bin 26, since the diverting sprockets 68 and 68a carried by the take-up arms 70 and 70a are in an upper position. When the photoelectric switch PS3 and PS3a mounted below the delivery board 108 is activated by contact with the bottom 27 of the bin 26 or with already deposited produce, a solenoid SOL-2 (FIG. 11) is activated to shift a hydraulic control valve and thereby retract the hydraulic piston 178 until the switch PS3 and PS3a is opened. The downward movement of the take-up arms 70 and 70a causes the interface conveyor 36 to pull the movable discharge head 14 upwardly. The discharge head 14 is movably mounted within the extended end 194 of the boom 16 by a plurality of rollers 196 shown in FIG. 5. Consequently, the discharge head 14 (as seen in FIG. 3) is free to move vertically in response to the take-up or slackening of the interface conveyor 36 by the hydraulically driven movement of the take-up arms 70 and 70a.

With respect to FIG. 5, the second upper sprocket 56 of the interface conveyor 36 is mounted within the discharge head by a cantilever arm 198 secured to the boom 16. Furthermore, the back face 199 of the discharge head 14 is almost completely open, as shown at 200 (FIG. 5), for the accommodation of this stationary sprocket when the discharge head 14 moves upward. It should be noted that cooperating sprocket 56a (not shown) on the other side 15 of the discharge head is similarly mounted on a cantilever arm secured to the boom 16.

Although the preferred embodiment of the present invention utilizes the vertical movement of the discharge head 14 with respect to the storage bin 26, it is envisioned that the mechanism can be easily adjusted to provide for relative movement of the storage bin with respect to the discharge head 14. In other words, instead of the discharge head 14 moving vertically downward into the storage bin 26 and gradually moving vertically upward as the bin is filled, it would be possible through a modification to the dry bin filler to have the storage bin 26 move vertically relative to the discharge head 14, so that the bin will be in its complete elevated position to receive the produce and will be caused to gradually lower as the bin becomes filled. This could be accomplished by the use of a lifting mechanism in the carriage 22.

In FIGS. 1 and 2 the carriage 22 is shown which receives the empty storage bin 26 and moves it into proper alignment with the dry bin filler discharge head 14. The carriage 22 has a set of dual parallel conveyors 203 and 205 (FIG. 2) operated through a common shaft 201 and drive chain 207 off the motor M2 to move the bin 26 from an empty bin feed conveyor 206 driven by motor M3 to a position beneath the discharge head 14.

The dual conveyors 203 and 205 each have moving support elements 209 that carry the bin into the carriage. The side guide rails 211 and 213 on the carriage aid in directing the bin into the carriage 22. Once the bin 26 has contacted the stop plates 208 and 210 with their respective switches LS7 and LS8 adjacent the back stop bar 215, the movement of the carriage conveyors 203 and 205 in the direction of arrow I (FIG. 2) is stopped. The carriage 22 is traversed along the carriage tracks 20 on support rollers 217 by a hydraulic system which operates a hydraulic shaft 24. The extending and retracting transversing motion of the directions of the respective arrows E and R (FIG. 1) provides for the necessary relative reciprocating movement between the discharge head 14 and the bin 26 to give the uniform layering of the produce within the bin. Once the bin is filled with the produce, it is moved to the unloading end 212 (FIG. 1) of the carriage track 20 where the dual conveyors 203 and 205 move in the direction of the arrow O (FIG. 2) to discharge the bin onto a full bin exit conveyor 214. The carriage 22 then returns to a position adjacent the empty bin feed conveyor 206 to receive the next empty bin to be filled with produce by the dry bin filler.

Hydraulic and Electrical Systems

The hydraulic circuitry for the dry bin filler apparatus of the present invention is shown schematically in FIG. 11. It should be noted that the various valves to control flow into and out of the hydraulic cylinders 25 and 176 are controlled by the energization of various valve-controlling solenoids which have been numbered SOL-1 through SOL-6. The manner in which these solenoids are energized is shown in the electrical schematic diagrams of FIGS. 10A and 10B. For ease in interpreting the diagrams, all relays have been given a number preceded by the prefix "RY" while each set of contacts is identified by a prefix "C" followed by a number corresponding to the relay with which such contacts are associated. The contacts are shown in their "normal" positions, i.e., the positions which they assume when their associated relays are not energized. Similarly, the limit switches designated by an "LS" followed by the switch numeral, are generally shown in their normal position, i.e., the position they assume when they are not contacted by another element in the apparatus. However, certain switches LS9, LS10, LS11, LS12, and LS13, are double pole switches which, when contacted, open one contact and close another contact in the circuit. The detailed description of the circuitry will be given in connection with the following description of the operation of the present invention.

General Operation

With respect to FIGS. 10A, 10B and 11, in particular, and FIGS. 1-9 in general, the dry bin filler 10 requires that carriage 22 be in its complete retracted position, so that switch LS13 on the carriage track 20 is activated to start the motor M2 to move the carriage conveyors 203 and 205 in the direction of arrow I in FIG. 1 to receive an empty bin 26 from the empty bin feed conveyor 206. The empty bin moves onto the carriage 22 until it contacts both of the stop plates 208 and 210 on the carriage and activates the respective centering switches LS7 and LS8 which stop the carriage meter M2. Both switches LS7 and LS8 must be activated before the carriage motor M2 is stopped in order to be assured that the bin 26 is in a squared orientation on the carriage 22.

When the empty bin 26 has moved off the empty bin feed conveyor 206, the movement of the next empty bin along the feed conveyor 206 deactivates the normally closed switch LS6 to stop the motor M3 driving the empty bin feed conveyor.

The closing of switches LS7 and LS8 also activates the hydraulic solenoid SOL-4 to cause the hydraulic piston shaft 24 to extend and move the carriage 22 in the direction of the arrow E in FIG. 2 until the carriage contacts double pole switch LS12 on the carriage track 20 which stops the traversing movement of the carriage. This extending movement of the carriage 22 is to generally center the empty bin under the discharge head 14 before allowing the downward movement of the discharge head. Consequently, the dry bin filler apparatus will be able to accommodate smaller length bins without having the discharge head hitting the side of the bin when the head is moving down. The contact with double pole switch LS12 activates a hydraulic solenoid SOL-2 to lower the discharge head 14. The delivery board 108 is oriented as shown in FIG. 3 when the discharge head 14 is coming down into the bin 26.

When the lower end 60 of the discharge head 14 reaches the bottom 27 of the empty storage bin 26, one of the photoelectric switches PS3 and PS3a is activated to energize the hydraulic solenoid SOL-3 to start the carriage retracting in the direction of arrow R in FIG. 3. Further, power is supplied to the motor M4 to start the respective produce conveyors, i.e., the interface conveyor 36, the inclined conveyor 32 and the delivery conveyor 42. Since the produce conveyors are operating, produce 28 will start being deposited in the bin 26. The protection drape 115 will tend to blanket the bottom 27 of the bin to help cushion and slow the movement of the produce leaving the delivery board 108.

The carriage 22 with the bin 26 will move in the retracting direction of arrow R until the bin side sensing levers 116 and 116a contact the side 120 of the bin. This will activate the switches LS2 and LS2a to stop the retracting traverse of the carriage. After a time delay, the hydraulic solenoid SOL-4 is activated to reverse the carriage movement in the direction of arrow E in FIG. 8. During the time delay the reversing motor M5 is activated (FIG. 5) to move the rotatable shaft 136 in the direction of arrow S, causing the control cables 124 and 126 to change the delivery board 108 orientation to that shown in FIG. 8. The movement of the reversing motor M5 is stopped by the stop bar 152 on the rotating shaft 136 contacting the stop switch LS15 when the cables 124 and 126 have moved sufficiently. However, because the produce conveyors 36, 32 and 42 continue to feed produce to the bin, the reversing of the delivery board is sequenced by the timing mechanism 154 with the position of the brushes 88, so that the delivery board will not change orientation when produce is about to exit the lower end 60 of the discharge head 14. Otherwise, the produce could be damaged by the movement of the delivery board.

The time delay before the change in direction of the traversing carriage 22 and the change in the orientation of the delivery board is also used to allow the produce to adequately fill the ends and corners of the bin for each layer of produce.

The carriage 22 will continue traversing in the direction of arrow E in FIG. 8 until the side 118 of the bin contacts side sensing levers 114 and 114a which activate the switches LS1 and LS1a. At this point the carriage will stop traversing in the direction of arrow E and, after a time delay, will begin to traverse in the direction of arrow R in FIG. 9 through the activation of the hydraulic solenoid SOL-3. The time delay is utilized to allow the delivery board to reverse its angled orientation to that as shown in FIG. 9. The switches LS1 and LS1a cause the reversing motor M5 to move the rotatable shaft 136 in the direction of arrow L to shift the delivery board 108 to the orientation of FIG. 9. The movement of the motor M5 is stopped by the stop bar 150 on the rotatable shaft 136 contacting the switch LS14. Further, the activation of the reversing motor M5 is controlled by the timing mechanism 154 to sequence the flipping of the delivery board 108 in conjunction with the proper location of the conveyor brushes 88 as discussed previously.

As the level of produce in the bin 26 increases, the produce sensors 164 are contacted, causing an activation of either of the photoelectric switches PS3 and PS3a which energize the hydraulic solenoid SOL-1 to raise the discharge head 14 slightly by the downward movement of the take-up arms 70 and 70a by hydraulic piston 178 (FIG. 3) until the produce sensors 164 deactivate the tripped photoelectric switch PS3 and PS3a. Because the discharge head 14 may be raised too far from the general layer of produce in the bin due to the produce sensors 164 contacting a single piece of produce, which may be higher than the surrounding produce, either of the photoelectric switches PS3 and PS3a also activates through a time delay a leak-down hydraulic solenoid SOL-5. This allows the discharge head, through the hydraulically controlled upward movement of the take-up arms 70 and 70a, to come down slowly to find the true level of the produce. Consequently, the discharge head 14 is continually moving up and down in small increments as it maintains its proper position just above the level of the produce.

The above described operation of the vertical movement of the discharge head 14 continues until the bin is filled with produce. When the bin is full, the resulting downward movement of the take-up arm 70a will contact the switch LS4 which stops the conveyor motor M4 and the feed of produce through the dry bin filler apparatus. Further, the switch LS4 will activate the hydraulic solenoid SOL-1 to raise the discharge head 14 clear of the bin until the switch LS10 is contacted by the take-up arm 70a to deactivate the hydraulic solenoid SOL-1.

When the switch LS4 is contacted, the movement of the traversing carriage 22 is stopped. However, the contact of switch LS10 causes the activation of the hydraulic solenoids SOL-4 to SOL-6 to allow the carriage 22 and the full bin 26 to traverse along the carriage tracks 20 in the direction of arrow E at a greater speed than the traversing movement during the filling operation. Once the carriage 22 reaches the unloading end 212 of the tracks 20, a switch LS9 (FIG. 1) is contacted. The contact with switch LS9 stops the traversing of the carriage 22 and starts the motor M2 to move the dual conveyors 203 and 205 in the direction of the arrow O in FIG. 2 to discharge the full bin. At this point the full bin exit conveyor 214 moves the full bin away from the carriage 22. The movement of the full bin onto the full bin exit conveyor 214 activates a switch LS11 which energizes the hydraulic solenoids SOL-3 and SOL-6 to retract the carriage 22 at a faster speed than during the filling operation back in the direction of arrow R to its position to receive a new empty bin, and the overall operation is automatically repeated to fill the next dry storage bin.

Although the best mode contemplated for carrying out the present invention has been herein shown and described, it will be apparent that modification and variation may be made without departing from what is regarded to be the subject matter of the invention.

What is claimed is:

1. An apparatus for gently transferring irregularly sized, fragile articles from a supply conveyor to a storage bin, said apparatus comprising:

means defining a transversely elongate inlet portion for receipt of said articles;

means defining a transversely elongate discharge portion for depositing said articles in said bin, said elongate inlet and discharge portions accomodating a row of articles;

means for establishing relative movement between said bin and said elongate discharge portion in a direction transverse to the elongate direction of said discharge portion; means including a pair of opposed article gripping conveyors for downwardly conveying said articles between said inlet portion and said discharge portion, said gripping conveyors having opposed elongate resilient means for gently cradling and suspending said articles between vertically adjacent pairs of said opposed resilient means, and said resilient means being uniformly spaced along each conveyor in the direction of movement thereof by an interval selected according to the size range of said articles conveyed therebetween;

means connected to said means defining said discharge portion for gently directing said articles from a lower end of said opposed gripping conveyors into said bin;

means for reversing said directing means to discharge said articles alternately from opposite sides of said elongate discharge portion in accordance with the direction of relative motion of said bin and discharge portion; and means for coordinating the operation of said reversing means with the position of said articles in said discharge portion to prevent the movement of said directing means when any of said articles have just excited said discharge portion thereby eliminating possible damage to said any of said articles by the movement of said directing means.

2. An apparatus for gently transferring irregularly sized, fragile articles from a supply conveyor to a storage bin, said apparatus comprising:

means defining a transversely elongate inlet portion for receipt of said articles;

means defining a transversely elongate discharge portion for depositing said articles in said bin, said elongate inlet and discharge portions accomodating a row of articles;

means for establishing relative movement between said bin and said elongate discharge portion in a direction transverse to the elongate direction of said discharge portion;

means including a pair of opposed article gripping conveyors for downwardly conveying said articles between said inlet portion and said discharge portion, said gripping conveyors having opposed elongate resilient means for gently cradling and suspending said articles between vertically adjacent pairs of said opposed resilient means, and said resilient means being uniformly spaced along each conveyor in the direction of movement thereof by an interval selected according to the size range of said articles conveyed therebetween;

a delivery board pivotally connected to said means defining said discharge portion for gently directing said articles from a lower end of said opposed gripping conveyors into said bin;

means responsive to the position of said bin relative to said discharge portion for pivoting said delivery board in one of two reversing orientations to direct said articles out of said opposite sides of said elongate discharge portion in accordance with the direction of relative movement of said bin and discharge portion;

wherein said pivoting means includes a rotatable shaft mounted adjacent said discharge portion;

a first cable having one end connected to and wrapped in a first direction around said rotatable shaft, said first cable having its other end connected to said delivery board on one side of its pivotal axis;

a second cable having one end connected to and wrapped in a second direction opposite said first direction of said first cable around said rotatable shaft, said second cable having its other end connected to said delivery board on the opposite side of its pivotal axis with respect to said first cable connection to said delivery board; and a reversing motor connected to said rotatable shaft for rotative movement of said shaft in either of two opposite directions, movement in one rotative direction causing said first cable to shorten between said shaft and said delivery board while allowing said second cable to lengthen between said shaft and said delivery board, resulting in a specified orientation of said delivery board.

3. An apparatus as defined in claim 2 wherein said pivoting means additionally comprises means mounted adjacent said shaft for limiting the amount of rotative movement of said shaft in either of said two opposite directions to an amount corresponding to said specified angular orientation of said delivery board.

4. An apparatus for transferring irregularly sized, fragile articles from a supply conveyor to a storage bin, said apparatus comprising:

means defining an inlet portion in conveying communication with said supply conveyor;

means defining a discharge portion to deposit said articles into said bin;

a pair of opposed conveyors connected between said inlet portion and said discharge portion for moving said articles from said inlet portion to said discharge portion, said articles changing elevations during said movement of the articles to said discharge portion; and a plurality of resilient brushes protruding from the opposed faces of said conveyors for gently cradling and suspending each of said articles as they are moved in a non-horizontal path by said conveyors, said plurality of resilient brushes being uniformly spaced on each of said conveyors in the direction of movement of the conveyors by an interval determined according to the size range of the articles, and said plurality of resilient brushes of said opposed conveyors forming sets of opposed resilient brushes spaced by said interval to thereby cradle and suspend said articles between vertically adjacent pairs of said sets of opposed resilient brushes during movement in said non-horizontal path.

5. An apparatus as defined in claim 4 wherein said brushes are pivotally mounted on said conveyors to accommodate varying sized articles.

6. An apparatus for gently transferring articles from a supply conveyor to a storage bin, said apparatus comprising:
- an inlet portion for receipt of said articles;
- a discharge portion for depositing said articles in said bin;
- means including a pair of opposed article gripping conveyors for conveying said articles between said inlet portion and said discharge portion;
- means connected to said discharge portion for gently directing said articles into said bin;
- means for reversing said directing means to discharge said articles alternately from opposite sides of said discharge portion; and
- means for coordinating the operation of said reversing means with the position of said articles in said discharge portion to prevent the movement of said directing means when any of said articles have just exited said discharge portion, thereby eliminating possible damage to said any of said articles by the movement of said directing means.

7. An apparatus for transferring fragile articles from a supply conveyor to a storage bin, said apparatus comprising:
- an inlet portion in conveying communication with said supply conveyor;
- a discharge portion to deposit said articles into said bin;
- a pair of opposed conveyors connected between said inlet portion and said discharge portion for moving said articles from said inlet portion to said discharge portion, said articles changing elevations during said movement of the articles to said discharge portion; and
- uniformly spaced resilient means protruding from the opposed faces of said conveyors for gently cradling and suspending each of said articles as they are moved in a non-horizontal path by said conveyors, said resilient means comprising a plurality of brushes, said brushes being pivotally mounted on said conveyors to accommodate varying sized articles.

* * * * *